July 1, 1930. E. H. FREEMAN 1,769,829
UNIVERSAL FASTENING FOR LAMP SOCKET CASINGS
Filed Jan. 19, 1926
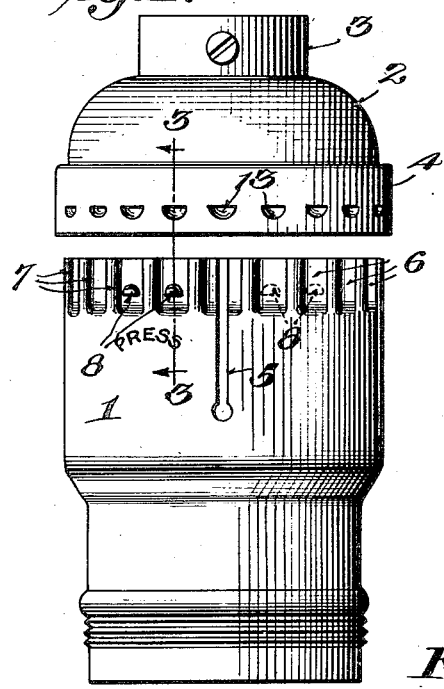
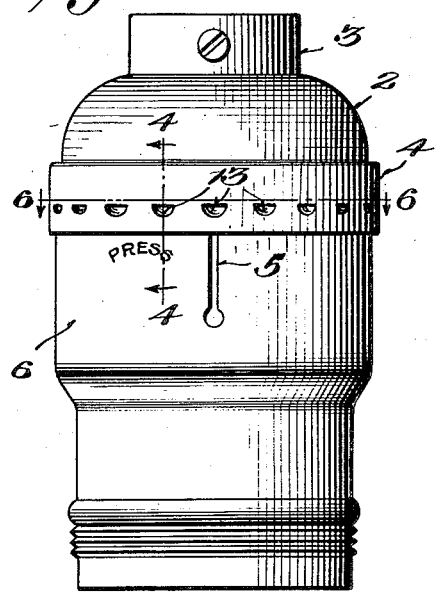
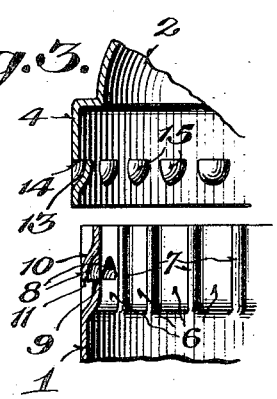
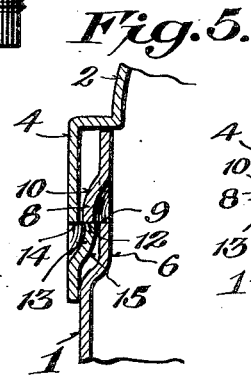
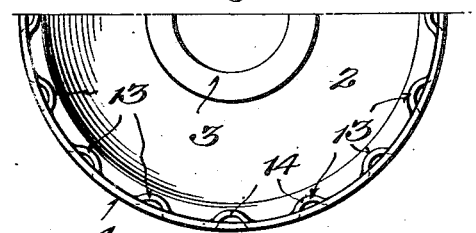
Inventor
E. H. Freeman Patented July 1, 1930

1,769,829

UNITED STATES PATENT OFFICE

EDGAR H. FREEMAN, OF TRENTON, NEW JERSEY, ASSIGNOR TO CIRCLE F MFG. CO., OF TRENTON, NEW JERSEY, A CORPORATION OF NEW JERSEY

UNIVERSAL FASTENING FOR LAMP-SOCKET CASINGS

Application filed January 19, 1926. Serial No. 82,325.

This invention relates to the cap and shell type of casing for electric lamp sockets and particularly has in view a novel fastening therefor which permits a universal adjustment for the shell in locking the same to the cap.

Modern requirements demand a construction of lamp socket casing wherein a plurality of locking positions are provided between the metallic shell and the metallic cap of the casing thereby to permit the shell to be so positioned when locked to the cap as to present the switch key of a key socket in a readily accessible and convenient position for manipulation, and also to permit the shell of a keyless socket to be quickly and easily snapped into its locked relation to the cap without special care or attention being required on the part of the workmen, as to the relative position of the parts when the shell is pushed into telescoping locking engagement with the cap.

Accordingly, the present invention contemplates a simple, reliable and positive fastening connection between the shell and cap parts of a lamp socket casing which admits of a universal circular adjustment for the shell so that the same locking means are effective in practically every position within the 360° of the circumference of the cap.

A further and distinctive object of the invention is to provide a type of fastening, not only permitting of the universal adjustments referred to, but also, a fastening which may easily and economically be made, and one that is entirely confined and concealed within and behind the flange of the cap, when the shell and the cap are in assembled locked relation, thereby obviating all obstructions and unsightly projections on the exterior of the socket casing, which is the condition prevailing with some types of fastenings for the cap and shell of lamp socket casings.

Another object of the invention is to provide a fastening of the type and character referred to which definitely and easily guides the two parts of the casing into their telescoping locked engagement, and when so engaged secures the cap and shell together in such a firmly locked condition as to secure the shell against displacement or unlocking either in a direction longitudinally of the casing, or by rotative movement. In other words, the improved cap and shell fastening of the present invention provides for locking the parts against relative rotation and also against longitudinal separation.

With these and other objects in view which will appear to those familiar with this art the invention consists in the novel construction, combination and arrangement of parts hereinafter more fully described, illustrated and claimed; and while the invention is susceptible of structural modification without departing from the essentials thereof, a preferred and practical embodiment is shown in the accompanying drawings, in which:—

Figure 1 is a side elevation of a lamp socket casing constructed in accordance with the present invention and showing the cap and shell slightly separated, but in proper relative position to permit of the shell being inserted and locked within the flange of the cap.

Figure 2 is a similar view showing the shell and cap of the casing telescoped and locked.

Figure 3 is an enlarged detail sectional view on the line 3—3 of Fig. 1.

Figure 4 is an enlarged detail sectional view on the line 4—4 of Fig. 2.

Figure 5 is an enlarged detail view showing more clearly the structural characteristics and interlocking relation of a catch projection on the cap with one of the locking projections of the shell.

Figure 6 is a detail sectional view on the line 6—6 of Fig. 2, the line of section being indicated by the line 6—6 of Fig. 5.

Figure 7 is a plan view of the cap inverted showing the inwardly deflected annular catch projections.

The novel cap and shell fastening constituting the present invention may be employed in connection with any standard or approved type of two-part casing for electrical lamp sockets, but the conventional form of lamp socket casing with which the invention usually and preferably is associated comprises the metal shell 1 and the cap 2, the latter being provided with the usual collar 3 for attachment to the fixture and with the peripheral flange or skirt 4 which telescopically receives one end of the shell 1. Also in carrying forward the invention the same utilizes the slot 5 formed longitudinally in the body of the shell 1 and extending to and opening through the edge of the shell which telescopically fits within the flange or skirt 4 of the cap. This slot 5, for the purposes of the present invention is termed herein, a longitudinally disposed resilience slot, which in a "key socket" is of a sufficient size to permit the switch key to project therethrough, but in a socket of the "keyless type" need only be of sufficient size and length to provide sufficient resiliency for the slotted end of the shell to permit of the automatic locking action and to permit the manual release of the parts as hereinafter more fully explained.

Referring more particularly to the details of the improved fastening constituting the present invention it will be observed from the drawings that the end edge of the shell 1 which fits and locks within the flange or skirt of the cap is provided with ribs and grooves throughout the full 360° of its circumference. These ribs and grooves are shown clearly in Figs. 1, 3 and 6 of the drawings and it will be seen that they are formed so as to leave no projections of any character beyond the outside surface or diameter of the shell. This makes a conformation involving the longitudinally disposed guiding grooves 6, closed at their lower ends and opened at their upper ends and the longitudinally disposed outwardly projecting ribs 7 alternating with and between the said grooves 6. This formation is uniform throughout, the guiding grooves 6 all being of the same width and length and the spacing of the outwardly projecting rib 7 being uniform about the circumferential edge portion of the shell 1.

Preferably at diametrically opposite locations on the shell are formed the diametrically opposite pairs of outwardly deflected and substantially downwardly extending locking projections 8 formed by transversely slitting the shell body as at 9 and pressing the cut metal outwardly to produce the projections 8 which assume a substantially half-moon form with the convexed rounded outer guiding surface 10 and the bottom cut edge 11 forming the locking edge which has a flat locking engagement with the corresponding cut edge 12 of any one of the corresponding inwardly deflected catch projections 13 pressed inwardly from the flange or skirt 4 of the cap. The inwardly deflected and substantially upwardly extending spaced catch projections 13 are formed in a continuous annular series on and within the flange or skirt 4 of the cap at regularly spaced intervals to provide for the universal adjustments of the shell herein referred to. Each of the said catch projections 13 is formed by transversely slitting the cap flange as at 14 and pressing the projections 13 inwardly, and is also of substantially half-moon shape whereby the inner convexed rounded guiding surface 15 has a free sliding engagement with the corresponding surface 10 of a locking projection 8 when the shell is telescopically inserted into the flange or skirt of the cap.

The catch projections 8 on the shell are preferably arranged in pairs, one projection of each pair lying in a groove formed by fluting the shell, and said pairs are preferably arranged at diametrically opposite points on the shell as will be observed from Fig. 1. One pair of catch projections 8 is formed in a location adjacent the resilient slot 5 and immediately above that portion of the shell free to move inwardly when the parts are telescopically united, or when manually pressed in by the finger or thumb for the purpose of releasing that pair of the locking projections from the catch projections of the cap with which they engage. After such release of the locking projections a mere tilting of the shell out of the cap will permit a complete disengagement and release. Also, in conection with the catch projections 8 it will be noted that the same are located entirely within the grooves or valleys of the flutes, and therefore have no projection beyond the exterior surface or diameter of the shell.

In assembling the cap and shell the same may be disposed in the relative relation shown in Fig. 1, wherein the bottom of the grooves of the shell carrying the locking projections 8 are aligned with a pair of corresponding catch projections of the cap, the shell being merely shoved into place in a straight longitudinal line with the projections riding one over the other, the portion of the shell next to the slot 5 moving inwardly to permit of this action, and then snapping back into place when the projections 8 clear the edge of the catch projections 13.

Ordinarily the cap 2 is attached to a fixture nipple and is therefore held rigidly locked in a fixed position. The socket interior is then wired and the shell 1 slipped over the same and then moved into telescoping relation with the cap as previously indicated, namely, by a straight thrust longitudinally or along the axis of the shell.

In order to release the cap and shell it is simply necessary to disengage the downwardly and outwardly disposed locking projections from the inwardly and substantially upwardly disposed catch projections 13, and in order to accomplish that result thumb or finger pressure may be exerted on the part marked "Press" on shell thereby to move the cut edge 11 of the locking projection 8 out of line with the corresponding cut edge 12 of the catch projection 13 of the cap, and the shell may be rocked on the opposite pair of catch projections 8 so as to release it from the cap.

Without further description it is thought that the features and advantages of the invention will be readily apparent to those skilled in the art, and it will of course be understood that changes in the form, proportion and minor details of construction may be resorted to, without departing from the spirit of the invention and scope of the appended claim.

I claim:—

An electric socket casing comprising a shell provided with a longitudinally extending groove opening through the end of the shell, a locking projection struck outward from the bottom wall of said groove, said projection having an outwardly convexed edge disposed in a plane substantially parallel to the plane of the end of the shell, said projection further being tapered in all directions from said edge towards the end of the shell and merging into the bottom wall of the groove, the width of said projection being less than the width of the groove, a cap including a circular wall to fit over the end of said shell, and a projection struck inward from said circular wall for cooperation with said shell projection, said cap projection having an inwardly convexed edge disposed in a plane substantially parallel to the plane of the end of the cap, said projection further being tapered in all directions from said edge towards the end of said circular wall and merging into the latter, the circular wall of the cap being uninterrupted except by the projection struck therefrom, and the width of said projection being less than the width of the groove in the shell and slightly greater than the distance from the side edges of said shell projection to the side walls of said groove whereby, when the cap is engaged over the shell with the projection thereon entered in the groove of the shell, limited rotation of the cap relative to the shell enables the projections on the cap and shell to spring pass one another substantially in side to side relation.

In testimony whereof I hereunto affix my signature.

EDGAR H. FREEMAN.